Inventor
Henry W. Roth
By Whittemore, Hulbert, Whittemore & Belknap
Attorneys

Patented Mar. 10, 1936

2,033,851

UNITED STATES PATENT OFFICE 2,033,851

MULTIPLE AUTOMATIC WELDER

Henry W. Roth, Ferndale, Mich., assignor to Multi-Hydromatic Welding and Manufacturing Company, Detroit, Mich., a corporation of Michigan Application September 28, 1933, Serial No. 691,305

16 Claims. (Cl. 219—4)

My invention has for its object to produce a welding machine that is provided with a plurality of electric welding devices that may be mounted in close relation to each other and so disposed as to produce welded areas along any desired line or lines, means being provided for so mounting the welding devices, that the line of weld may extend curvedly or straight or in broken lines or in separate lines and two or more pieces of sheet metal may be welded into an integral structure. The invention is particularly of advantage when used for welding plates together which have been die pressed to form curved surfaces, such as in forming automobile bodies or automobile sheet metal parts.

The invention provides a machine whereby a number of plates, two or more, may be welded together along their contacting edge portions in a single complete operation of the machine, to form a sheet metal structure of any form and usable for any purpose.

The invention also provides a means for electrically welding along straight or curved or irregular or separated lines by the sequential operation of a plurality of welders, means being provided for directing the source of supply of current to the members in sequence and enabling utilization of a relatively low pressure means and a relatively small current that may be supplied by a single pump and a single transformer. Thus the invention provides a substantially continuous welding operation throughout the contacting areas of two or more plates.

The invention also provides automatic means for producing a rapid sequential operation of the welders whereby each successive contiguous welding area will be produced upon the completion of the welding of the preceding area.

The invention also consists in providing conjunctively usable welders of different forms to enable closely disposed welds in structures that by reason of their configuration require different forms of welders to produce the integrated union required to produce a completed sheet metal structure in a single operation of the welding machine.

The invention also consists in means for producing the required sequential pressure in advance of each sequential closing of the primary circuit of the transformer to produce the resultant low potential and high amperage through the welding point in contact with the work.

The invention consists in other features and advantages which will appear from the following description and upon examination of the drawings. Structures containing the invention may partake of different forms and may be varied in their details and still embody the invention. To illustrate a practical application of the invention, I have selected a welding machine embodying the invention as an example of the various structures and the details of such structures that contain the invention, and shall describe the selected structure and a modified form of welder hereinafter, it being understood that variations may be made and that certain features of my invention may be used to advantage without a corresponding use of other features of the invention, and without departing from the spirit of the invention. The particular structure selected and the modified form of welding member are shown in the accompanying drawings.

Fig. 1 is merely illustrative of assembled parts of a machine containing the invention.

In the form of machine illustrated in the drawings, the welders 1 are provided with brackets 2 that may be connected to any suitable support, such as the bar 3, which is connected to a movable frame 4 of a machine. The welders are provided with cylinders and pistons that operate the welding points. The movable frame 4 is raised and lowered as in the form of a large press that supports and moves the parts that are connected hydraulically or pneumatically to the welders. The welders may thus be raised and lowered and thus located in operative relation with respect to the work, that is, the plates 7, that are supported on a heavy copper bar 8 located, preferably, upon a fixed part 9 of the machine. The conductor bar 8 may be suitably reinforced to withstand the pressure to which the plates are subjected in the progressive welding operations produced by the welders 1.

The supported bar 8 will necessarily conform to the shape of the line of contacting areas of the plates 7 that are to be welded together. Thus the bar 8 may be curved so as to correspond to the various shapes into which the plates may be formed. Likewise, the bar 3 will be correspondingly bent or shaped and the brackets 2 may be cut to vary the location of the welders, with respect to the bar 3, and so as to permit movement of the movable part 4 of the machine and to cause the welders to be axially located in lines that extend at right angles to the surfaces of the plates at the points where the welding points of the welders may contact with the upper of the plates. The brackets 2 may be cut or grooved and welded to the bar 3 to so locate the axes of the welders that the welder points will strike the surfaces of the plates in directions that are at right angles thereto.

The welders may partake of different forms and their welder points may be angularly disposed or disposed in non-alignment with the axes of the cylinders of the welders. They are, preferably, hydraulically operated which enables them to exert a high pressure in a very short interval of time and produce welds at closely spaced points. By the use of oil as a medium of transmission a much higher pressure can be produced by a very small cylinder and piston. It also enables the use of a more positive pressure and the pressure is transmitted with greater rapidity in that it eliminates an extended compression period. Also, by the use of a liquid, all rebound or kickback, otherwise occurring when the pistons are released, is eliminated. Thus, where pneumatic cylinders are used the weld points have to be spaced 3 inches apart, while in connection with the use of hydraulic welders they may be spaced 1 inch apart. Also, by reason of the smallness of the hydraulic welders, they may be readily located in corners and welds may be made close to corners. Also, by reason of the diameter of the welders, they may be readily positioned at any angle and supported in closely arranged relation on curved bars for purposes of supporting the welders in position to produce closely positioned welds on curved surfaces of the contacting portions of the plates arranged in any desired relation with respect to each other. Thus the welders may be readily arranged at all angles, and inside of overhanging portions of and in places that are limited by reason of the shape of the sheet metal structure that is to be integrally formed by interwelding of the sheets together.

Also by the reason of the rapidity of the application of the pressure that is obtainable through the use of a liquid as a medium for transmission of pressure, the welds may be made with correspondingly great rapidity. In machines containing the invention the welds are made at the rate of three per second, while pneumatically operated welders require long period of time to raise the pressure to a proper welding pressure and delays the formation of each weld three or four seconds.

The flow of the liquid to the welders is controlled by a plurality of valves that are sequentially operated to direct the flow of liquid from a source of supply under pressure to the welders in succession, means also being provided for producing a low voltage current through the low resistance circuit through the welding points of the welders in succession, and after the pressure fluid has created in each welder the required welding pressures.

The welders 1 are connected to a bank of valves 12, supported in a plurality of blocks 13, that are tied together to locate the valves in two rows. The valves are connected with their respective associated welders 1 through the tubes 14 and a means for sequentially operating the valves is provided for causing the valves to open the connection between the source of supply of liquid under pressure with the welders and to close the connections and subsequently open return connections to a reservoir. Between the operations of each valve a suitable high amperage current is caused to pass through the contacting portions of the plates at the welder point to produce the weld.

Each welder 1 is provided with a cylinder 18 that may be threaded into the ends of the bracket parts 2, and a piston bearing member, or bushing, 19, may also be threaded into the bracket part 2. The bushing 19 forms a suitable bearing for the piston rod 20 having at its upper end the leather cup piston 21 located in the cylinder 18. The tube 14 is connected to the upper end of the cylinder 18 and to that particular portion of the block 13 having the valve 12 that is associated with the welder. When the valve 12 is moved it opens the source of supply of liquid under pressure to the cylinder 18 and the pressure of the fluid causes the piston 21 to descend.

Figure 1:
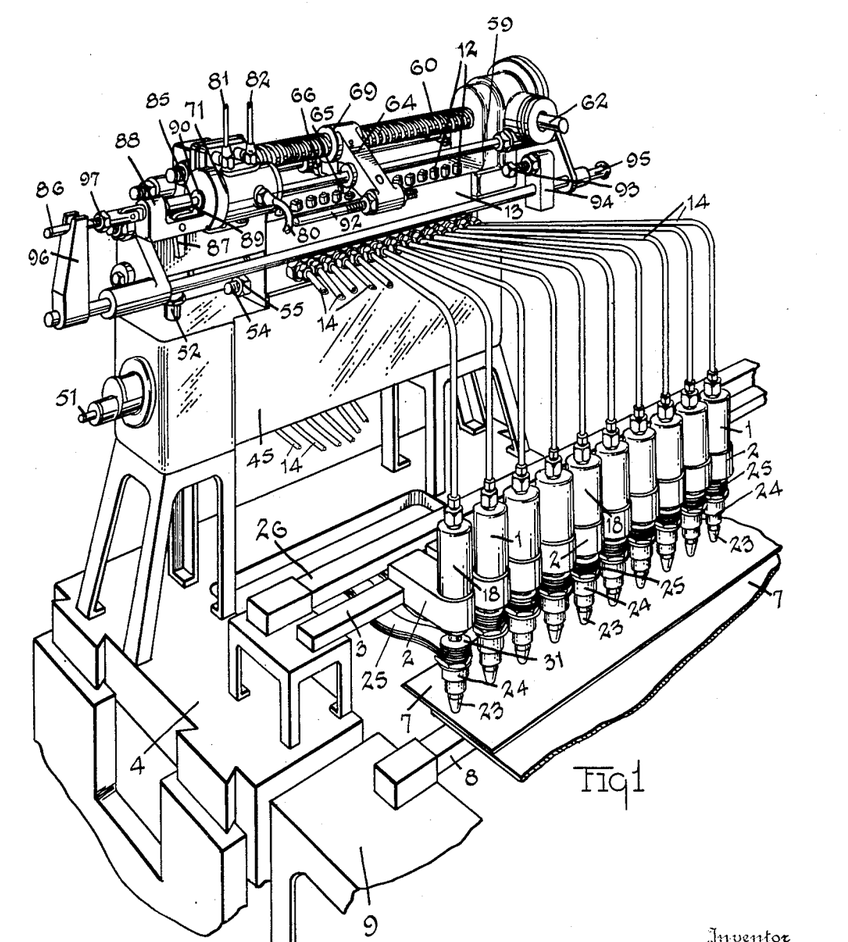
Fig. 1 of the drawings illustrates an assembly view of material parts of the machine that may be utilized for welding a plurality of sheets together.
Figure 2:
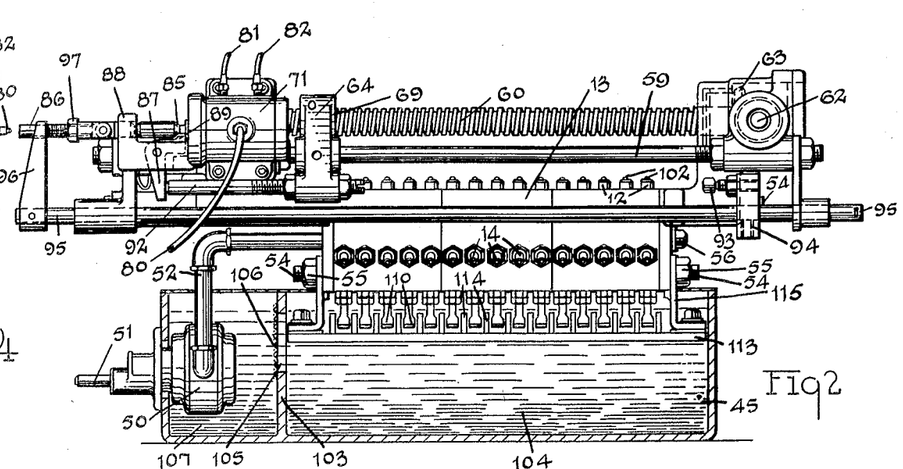
Fig. 2 illustrates a tank of oil controlling valves and the mechanism for sequentially operating the valves.
Figure 3:
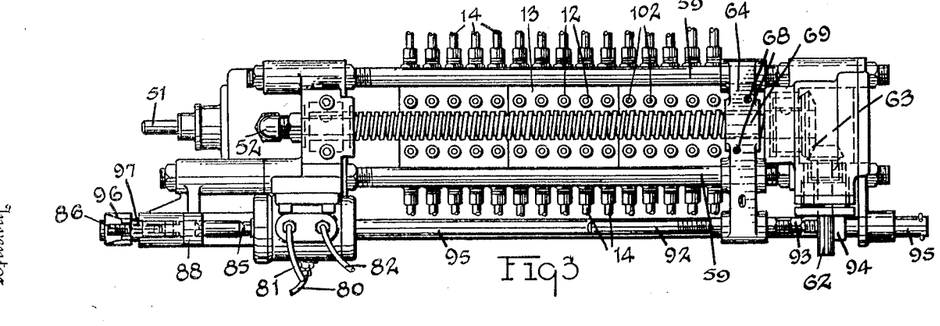
Fig. 3 is a top view of the device illustrated in Fig. 2.
Figure 4:
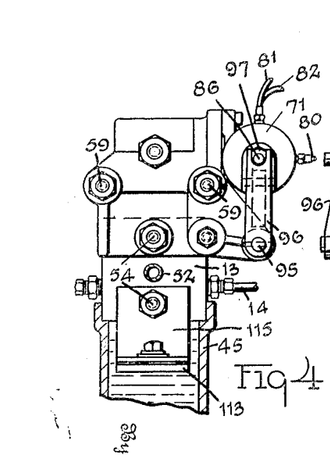
Fig. 4 is an end view of a valve controlling mechanism.
Figure 5:
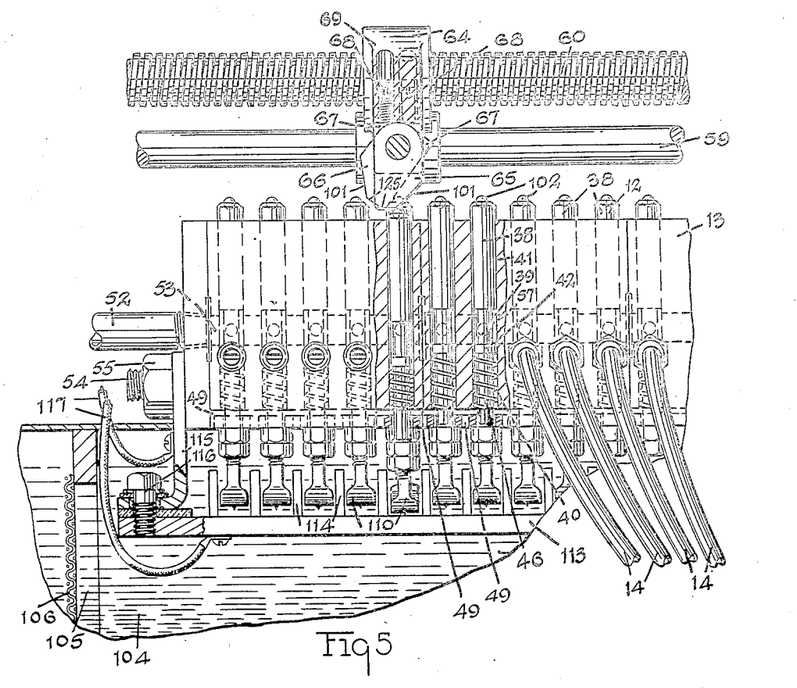
Fig. 5 illustrates an enlarged view of a part of the mechanism shown in Fig. 2, portions of which are shown in section.
Figure 6:
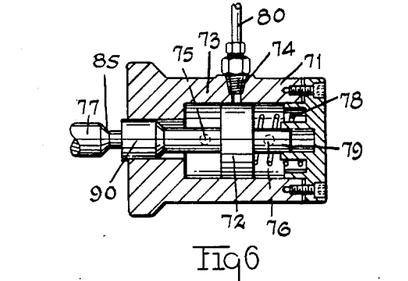
Fig. 6 illustrates a piston valve for controlling the valve actuating mechanism.
Figure 7:
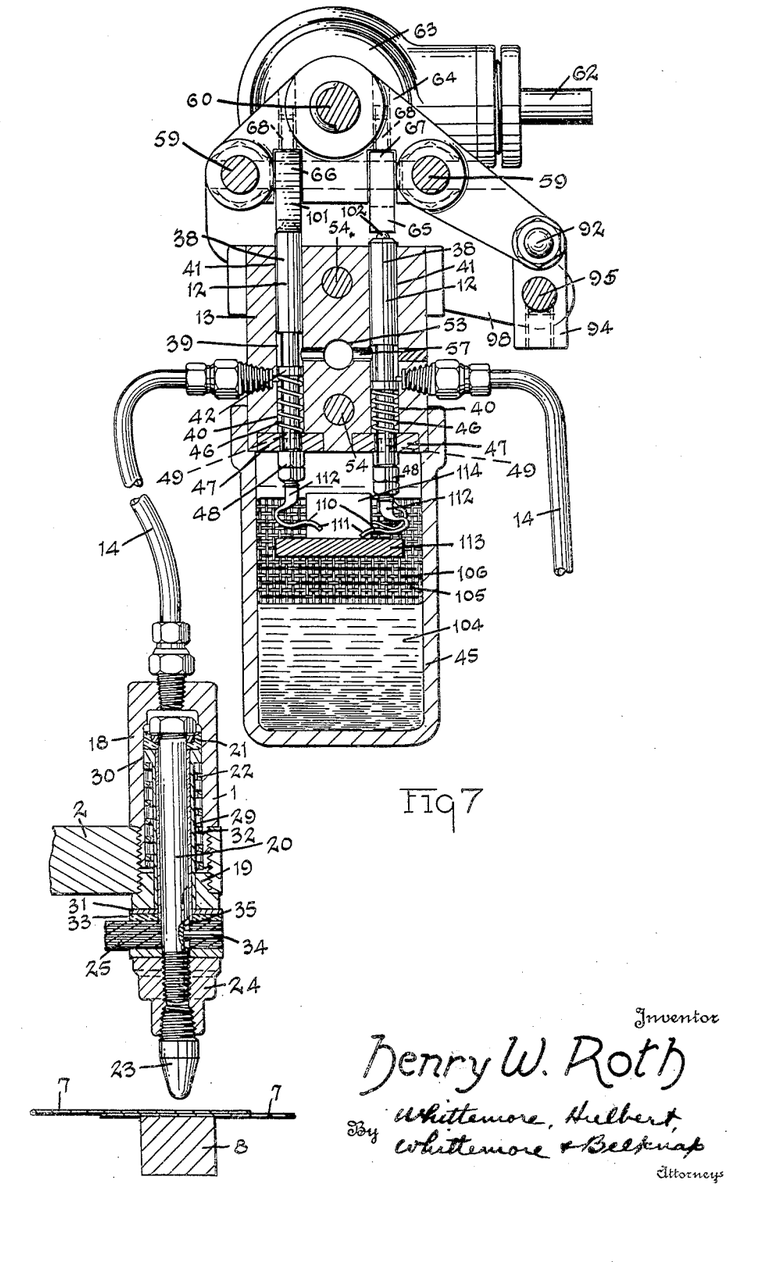
Fig. 7 illustrates the connection between one of the welding members and the valve controlling mechanism.

A spring 22 is located in the cylinder 18 and intermediate the piston 21 and the bushing 19, and operates to cause the return of the piston 21, when the pressure in the cylinder 18 is released by a return movement of the valve 12, which permits the liquid within the cylinder 18 to return to the source of supply of the liquid, that is, to a reservoir. The spring 22 thus causes the welder point 23 to be raised from the work. The welders may be constructed to fit the conditions in which they are to be used and thus may partake of different forms. In the form shown in Fig. 7 the welder points 23 are connected to the piston rods 20 by a suitable threaded connector 24 that also operates to clamp the flexible low resistance conductor 25 and establish connection between the conductor 25 and the welder point 23. A metal sleeve 29 is located on the piston rod 20 and is provided with a flanged end 30. It extends through the bushing 19 and abuts the piston and a disc or washer 31. A sleeve of insulating material 32 is located within the sleeve 29 and a disc of insulating material 33 is located exterior to the metal disc or washer 31. The insulating sleeve 32 extends from the leather cup 21 to the insulating disc 33 and so as to completely electrically insulate the piston from the cylinder 18 and consequently the insulating sleeve and the disc prevent pitting of the piston rod, particularly at the point that it passes through the bushing 19. When the connector 24 is threaded onto the piston rod 20, it engages the end of the flexible conductor 25 and operating through the upper end of the piston rod, the metal sleeve 29 and the metal disc 31, the end of the flexible conductor 25 is secured in position and electrically connected with the welder point 23.

In order to prevent disconnection and rotation of the piston 20, a suitable pin 34 may be inserted in the end of the flexible conductor 25 where it is clamped by the sleeve 24 and so as to locate an end portion of the pin 34 in a slot 35 formed in the piston rod 20.

Figure 8:
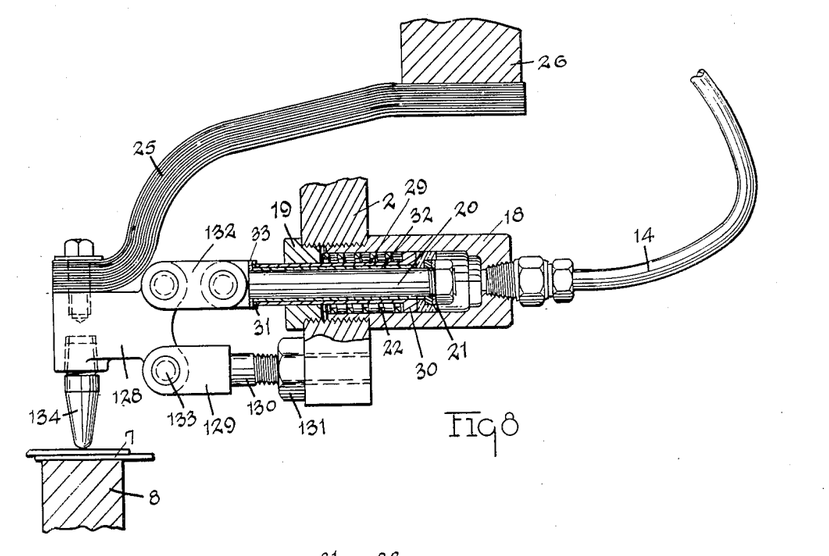
Fig. 8 illustrates a modified form of a welding member which is particularly adapted for use under a ledge or in a small corner or space.

In order that the welders may be located in spaces that are limited by reason of the forms of the structures that are to be produced, such as in closely confined spaces as under the cowl of an automobile and in corners that require overhanging of the welding points from the cylinders or the brackets, they may be formed to operate in different ways to produce the required pressure in advance of the introduction of the relatively large welding current. In the form of construction illustrated in Fig. 8, the welder is supported on the bracket 2 that may be constructed and supported in substantially the same way that the bracket 2 of the form of welder illustrated in the other figures. Likewise, the cylinder 18 and the piston rod 20 may be insulatedly supported and connected in operative relation to each other and so as to produce movement of the piston 21 by the pressure that is transmitted through the tube 14 which is connected to its associated valve located in the assembled blocks 13.

In order that the welder may produce a pressure in a direction in non-alignment with the axis of the cylinder, a block 128 is pivotally supported on a yoke 129 that may be connected to the bracket 2, such as by the adjustable threaded pin 130 and the locking nut 131. The block 128 is connected to the piston 120 by means of a link 132 and when the piston 21 is depressed by the pressure of the oil transmitted through the tube 14, the block 128 will be swung on its fulcrum pin 133 and be pressed against the work 7. The welder point 134 is connected to the block 128 and through the block 128 to the conductor 25. A plurality of welders, of the form shown in Fig. 8, may be used together or any number in conjunction with welders, of the form shown in Fig. 7, and controlled and caused to operate sequentially by the valves 12.

Each valve 12 comprises a stem 38 having portions cut therefrom to form the passageways 39 and 40 within the bores 41 in the blocks 13 in which the stems 38 are located. The passageways 39 and 40 are separated by the portion 42 of the stem 38 that has substantially the full diameter of the bore 41 and in which the valve stem is located, and forms a piston part that separates the passageways 39 and 40.

The stem 38 is normally supported in a position to locate the piston part 42 of the stem at a point to establish connection between the cylinder 18 of its associated welder with the reservoir of oil 45. The stem is yeldingly held in this position by means of the spring 46. The lower ends of the stems 38 extend through the blocks 47 that have passageways 49 that communicate with the passageway 48 and provide for full return of the oil to the reservoir when the valve stems are raised by the springs. The lower end of the stem is threaded and the movement of the stem by the operation of the spring 46 is limited by means of the nuts 48 that may be threaded onto the stem 38.

The piston 21 and the welder point 23 are subject to the pressure created by a suitable pump 50 that may be electrically driven by a suitable motor that may be connected to the shaft 51. Preferably, the pump 50 is located within one end of the reservoir 45 from which it draws the oil and directs it to the pipe 52 through which the pressure is transmitted to the passageway 53, formed in the blocks 13. The passageway 53 is formed by registering bores made in the plugs 13. The end of the passageway 53 through the blocks may be closed by a suitable plug 55.

The blocks 13 are suitably tied together by means of the rods 54 and the nuts 55, suitable packing being provided to prevent the escape of the oil from between the contacting faces of the blocks 13. Thus any number of blocks having the valves 12 may be readily assembled or dismantled to provide for the control of any number of welders. The supporting bar 3 is made to conform to the contour of the overlapping or contacting portions of the sheets 7, and the conductor 8 is likewise made to conform to the configuration of the contacting portions of the sheet. The welders are joined to the supporting bar 3 to locate the welder points along the required welding line and position them so that the welder points will, when depressed, move against the upper plate 7 in a direction that is substantially at right angles to the surface of the plate at the point where it makes contact. The welders are then connected hydraulically to the blocks 13 so as to be controlled by the valve and electrically to the conductor bar 26 which may also be conveniently formed to establish connections with the conductors 25 and thus may be made to roughly conform with the contour of the overlapping portions of the plates 7.

When any one of the valves is operated as by depression of a stem 38 against the pressure of the spring 46, the pressure created by the pump 50 is transmitted immediately through the pipe 14 to the piston 21 of the corresponding welder and causes the welder point 23 to immediately tightly press the work against the conductor bar 8. When, therefore, the circuit of the primary is completed, a current of large amperage passes through the welder points and by reason of the contact resistance of the metal of the plates 7, the weld is produced in the manner well known in the art. The current through the transformer is immediately opened and this is followed by the release of the pressure of the fluid and the immediate release of the plates 7 and withdrawal of the welder point.

The sequential operations of the valves 12 and the control of the circuit of the primary coil of the transformer are attained by any suitable mechanical or electromagnetic means that may be operatively connected to the stems 38 of the valves to cause their sequential operations, means being provided for closing a switch in the circuit of the primary coil of a transformer upon, or shortly after, the operation of each valve. The circuit of the primary may be completed by a time relay, of the type well known in the art, that phlegmatically operates to complete the circuit of the primary coil upon the passage of a current through the controlling coil of the relay and after the expiration of a very short time interval. This is followed by a period of closure and then automatic opening movement of the relay. The circuit of the controlling coil of the relay may be completed by contacts connected to the valve stems and thus initiated in its operation upon operation of any one of the valves.

Figure 9:
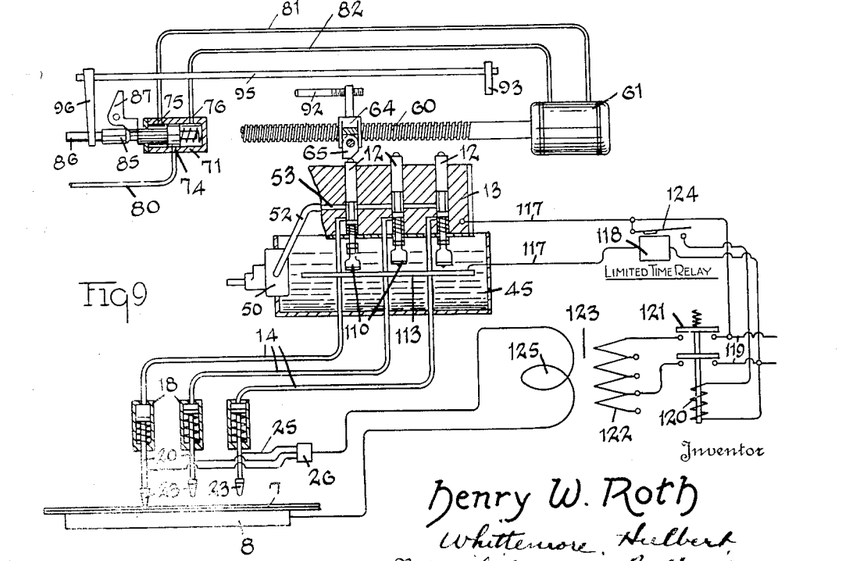
Fig. 9 illustrates, diagrammatically, the electric and hydraulic connections of the parts of the apparatus.

The valve operating mechanism, in the particular form of construction shown in the drawings, comprises a screw 60 that may be operated by a suitable reversible air motor 61, indicated diagrammatically in Fig. 9, and which may be connected to the shaft 62. The shaft 62 is connected by suitable beveled gears 63 with the screw 60. A traveler 64, having a threaded part 68, is shifted over the bank of valves 12 by means of the screw 60. It is guided by means of the rods 59 secured to suitable end brackets. The traveler 64 is provided with a pair of cams 65 and 66 that are pivotally connected to the traveler 64, and provided with projecting limiting stops that prevent limited rotation of the pivoted cams in one direction. The cams 65 and 66 are supported on the traveler 64 so as to engage the upper ends of the stems 38 of the valves and sequentially depress them as the traveler 64 is moved back and forth over the blocks 13. The valves are arranged along two parallel lines and the cam 65 is located so that it will operate the valves arranged on one side of the passageways 53, while the cam 66 is supported so as to operate the valves located on the other side of the passageway 53. Limiting stops of the cam 65 are such as to hold the cam 65 as against rotation as it is carried over the ends of the valve stems located on one side of the passageway 53, but upon return movement of the traveler 64, the cam 65 rotates relative to the traveler 64 so as to ride over the ends of the valve stems without depressing them while the other cam 66 is held in position by its limiting stop so as to cause the valve stems of the other side of the passageway to be sequentially depressed, and again upon the reverse movement of the traveler 64 the cam 66 merely rides without depressing the valve stems associated therewith, while the valve 65 is operated to depress sequentially the valve stems associated therewith.

In the form of construction shown, each cam 65 and 66 is provided with a projecting portion 67 and the traveler 64 is provided with adjusting pins 68 that are adapted to engage the projecting portion 67 and may be utilized for not only limiting the movement of the cams so as to hold them in position to cause the sequential operation of the valves, but also may be adjusted to adjust the extent of the depressed movement of the valves to produce the desired stroke of the valve stems. Thus the cams operate to sequentially connect the cylinders 18 of the welders 1 with the fluid under pressure that is transmitted through the tube 14 from the passageway 39.

The movement of the traveler 64 is controlled by means of the air valve 71. The air valve 71 has a piston member 72 located within a shell 73. The shell 73 has an air inlet port 74 and the outlet ports 75 and 76. The piston 72 operates to either close the inlet port 74 or to connect the inlet port 74 either with the outlet port 75 or the outlet port 76, according to one of the three positions that may be taken by the piston 72. The piston 72 is provided with a stem 77 for moving the piston inwardly with respect to the shell 73. A spring 78 is located within the shell and around a guiding stem 79 for the purpose of moving the piston 72 counter to the movement produced by the stem 77.

A suitable source of supply of air under pressure, such as a suitable air pump, is connected to the port 74 by means of the tube 80 and the ports 75 and 76 are connected to a suitable reversible air motor by means of the pipes 81 and 82. When, therefore, the piston 72 of the valve 71 is moved to one position, the air motor that drives the shaft 62 is caused to rotate in one direction and when the piston 72 takes a second position, the air motor is caused to drive the shaft 62 in the opposite direction and when the piston 72 takes a neutral position so as to close the port 74 of the valve 71, the motor ceases its operation.

The positions of the piston and consequently the operation of the valve 71 to control the movement of the traveler 64 are obtained through the actuation of the stem 77. The stem 77 of the piston is provided with a pair of grooves 85 and a projecting end portion 86 that may be used for manually operating the piston 72. A spring pressed latch 87 is pivotally supported on a bracket 88 and has a projecting nose 89 that is adapted to engage in the groove 85. The latch 87 operates to hold the piston 72 in the position to which the stem 77 may be moved. Initially the traveler 64 is located at the end of the screw 60 where it is connected to the bevel gear wheels 63. The stem 77 is pushed in manually by pressure against the handle end portion 86 of the stem, which causes the nose 89, which initially rides on the cylindrical part 90 of the stem 77, to drop in the groove 85. This establishes connection between the ports 74 and 75 and causes the air motor to rotate the screw 60 in a direction to move the traveler 64 to the opposite end of the screw 60, that is, to the end located near the valve 71. The traveler 64 is provided with a rod 92 adjustably secured in position for engaging the latch 87 and operates the latch to release the stem 77. The spring 78 operates to move the piston 72 to establish connection between the ports 74 and 76 and cause the motor to move in a reverse direction. As the traveler 64 approaches the end of the screw 60, namely, that in proximity to the gear box 25 having the gear wheels 63, it engages an adjustable screw 93 that is connected by a bracket 94 to the rod 95. The rod 95 is connected to an arm 96 that has a slot formed in one end through which the end portion 86, of the stem 77, extends. A suitable nut 97 is adjustably located on the stem 77 and is engaged by the end of the arm 96 to push the piston 72 to its neutral position and close the inlet port 75 and stop the air motor. The piston 72 is held in this position against the pressure of the spring 78 by the traveler. When the stem 77 is manually manipulated to force the stem inward until the nose 89 of the latch 87 engages in the groove 85 and holds the piston in position to cause the traveler 64 to move over the valves, causing operation of one set of valves and upon reversal of the valve 71 and return movement of the traveler 64, it will cause the operation of the other set of valves and the resultant sequential operation of the welders controlled by the valves.

In order that the valve stems may be readily depressed by the inclined surfaces 101, of the cams 65 and 66, the ends of the stems of the valves are provided with balls 102 that may be secured by flanged over edges of recesses formed in the upper ends of the stems and thus secured in position. The balls 102 will operate to reduce the friction of the mechanism operative to depress the stems.

To produce separation of the sediment in the oil that forms in the use of the machine, the reservoir 45 may be provided with a partitioning wall 103 which will afford an opportunity for the sediment to settle in the chamber 104 in which the ends of the valve stem extend. The upper end of the partitioning wall 103 is provided with an opening 105 that may be covered by a suitable screen 106 which will prevent the movement of the sediment charged oil and will prevent air charged oil from entering the chamber 107 in which the pump 50 is located.

The lower end of each stem 38 is provided with a contact 110 that may be formed to have an elastic spring part 111 and a socket 112. The socket 112 may be threaded onto the end of the stem 38 to secure the contact 110 in position. The elastic part 111 enables variation in movement of the stem while the contact 110 is in contact with the contact bar 113. The contact bar 113 is supported, preferably, below the surface of the oil in the chamber 104 of the reservoir 45. Submergence of the bar 113 and the contacts 110 in the oil reduces arcing and burning at the breaks of the contact when the stems are released. Preferably, the contacts of the stems are separated by walls 114 forming stalls in which a pair of the contacts of the stems are separated from adjoining contacts. The conductor bar 113 is suitably insulated from the brackets 115 by means of which they are supported on the assembled blocks 13. Suitable conductors 117 are connected to the conductor bar 113 and the frame and are then connected to the conductor bar 113 and the contacts 110.

The conductor bar, as shown in the diagram in Fig. 9, is connected to the limited time relay 118 and to one of the main lines 119. The other of the main lines 119 may be connected to the assembled blocks 13 whereby a circuit will be completed through the limited time relay 118 when contact is made between the conductor bar 113 and one of the contacts 110. This will occur each time a valve stem is depressed by the operation of one of the cams. The limited time relay closes a circuit through the coil 120 which electromagnetically operates the double-pole switch 121 to close the circuit of the primary coil 122 of the transformer 123. The secondary coil is a low resistance coil having but a turn or two, which is connected to the conductors 25 of the welders and to the conductor bar 8 of the machine. The circuit through the primary coil to the main lines 119, however, is not completed by reason of the delayed action of the limited time relay 118 until after one of the welder points 23 has been pressed against the sheet metal to press contacting portions of the sheets against the conductor bar 8. The limited time relay 118 is set to release automatically, its armature 124 in a very short time after the switch 121 has been closed by its operation. The limited time relay is so set as to perform this closing and opening movement during the period that the surfaces 125 of the cams 65 and 66 ride over the ends of the stems 38 of the valves so that in advance of release of each of the valves by the cams, the circuit of the primary of the transformer 123 is opened and upon releasement of the valve, its associated welder has moved its welder point away from the plates.

By reason of the fact that the welders are hydraulically operated and the pressure is immediately transmitted through the medium of the oil in the tube 14, to the pistons 21, and the time relay is set for closure as soon as the welding points are pressed against the work and immediately upon the rise of the temperature to enable a perfect weld without burning, the time relay opens the primary circuit. Shortly thereafter, giving opportunity for the hot metal to set and the weld to draw, the welding point is then raised. These operations occur in an exceedingly short interval of time and can be readily gauged by adjustment of the time limit relay. The machine will consequently produce the welds exceedingly rapidly and each weld will be accurately and perfectly formed. It is, however possible to simplify the design of the machine and to avoid the timing relay by using the movement of the valves to directly determine the welding time. In this instance the speed of the traveller will control the welding time. In many instances it may be necessary to weld various thicknesses of metal in the same machine. The machine should therefore adjust itself from spot to spot to take care of the variations in thickness. My invention makes this possible by applying means to automatically vary the speed of the traveller or the voltage of the welding current, while the machine is in operation. For this purpose, for instance, adjustable contacts may be arranged in the way of the traveller, these contacts to operate a checking valve (to influence the speed of the air motor) or a throw-over switch (to change the number of primary turns). Thus it is possible to automatically change the welding time or welding current, when the traveller operates a certain preselected valve.

I claim:

1. In a welding machine, a plurality of welders each having a cylinder and a piston, and a welding point operated by the pressure of the fluid in the cylinder, a source of supply of fluid under pressure, a source of supply of electric current, means for sequentially connecting the cylinders with the said source of supply of fluid pressure, and means for connecting the said welding points with the said source of supply of current sequentially, each welded point being connected with the source of supply of current during the periods of connection of its associated cylinder with the source of supply of fluid.

2. In a welding machine, a plurality of welders each having a cylinder and a piston and a welding point operated by the pressure of the fluid in the cylinder, a source of supply of fluid under pressure, a source of supply of electric current, means for connecting and disconnecting the cylinders with the said source of supply of fluid pressure, and means for connecting and disconnecting the said welding points with the said source of supply of electric current, the last named means operative to connect and disconnect each welder point intermediate the connection and disconnection of its associated cylinder, the said means operative to connect the welders in succession to the source of supply of fluid pressure and to the source of supply of electric current acting sequentially.

3. In a welding machine, a plurality of welders each having a cylinder and a piston and a welding point operated by the pressure of the fluid in the cylinder, a source of supply of fluid under pressure, a source of supply of electric current, a valve for controlling the flow of the fluid from the said source of fluid pressure to each welder, and a circuit closing means for producing a current through the welding point upon operation of each of the said valves, and means for sequentially operating the said valves.

4. In a welding machine, a plurality of welders each having a cylinder and a piston and a welding point operated by the pressure of the fluid in the cylinder, a source of supply of fluid under pressure, a plurality of blocks, each of the blocks having a plurality of valves, the blocks having a common passageway and connected with the source of supply of fluid pressure, means for connecting the welders to the blocks, parts having passageways controlled by the said valves for connecting the welders with the first named passageway, a source of supply of electric current, a plurality of contacts, and means for operating the said contacts in conjunction with the operation of the said valves for connecting the source of supply of electric current with the said welding points.

5. In a welding machine, a plurality of welders each having a cylinder and a piston and a welding point operated by the pressure of the fluid in the cylinder, a source of supply of fluid under pressure, a plurality of valves arranged in alignment for connecting the welders to the said source of supply, a traveler, means for reciprocating the traveler, the traveler having means for operating the valves in sequence, contacts connected to the valves and movable therewith, a source of supply of electric current connected to the welding points and controlled by the movement of the said contacts.

6. In a welding machine, a plurality of welders each having a cylinder and a piston and a welding point operated by the pressure of the fluid in the cylinder, a source of supply of fluid under pressure, a plurality of valves having movable valve members and divided into two sets, the valve members of each set arranged in parallel alignment, a traveler, means for reciprocating the traveler, the traveler having means for actuating the valve members sequentially in the reciprocatory movements of the traveler for connecting the welders in succession with the said source of supply of fluid under pressure, a source of supply of electric current, movable contacts connected to the valves, a contact bar forming a common fixed contact for said movable contacts for completing the circuit of the said source of supply through one of said movable contacts upon movement of any one of the valve members.

7. In a welding machine, a plurality of welders, each welder having a cylinder and a piston and a welding point operated by the pressure of the fluid in the cylinder, a source of supply of fluid under pressure, valve members for controlling the flow of the fluid to the said welders, a traveler having means for operating the valve members in sequence, a screw for reciprocating the traveler with reference to the valve members, a reversible fluid motor for operating the screw, a valve for controlling the fluid motor, means for operating the valve to initiate movement of the traveler, and means for operating the valve to reverse the motor and to stop the motor.

8. In a welding machine, a plurality of welders each having a cylinder and a piston and a welding point operated by the pressure of the fluid in the cylinder, a source of supply of fluid under pressure, a plurality of blocks having passageways, means for securing the blocks together to locate the passageways in alignment, means for connecting the said passageways with the said source of supply of fluid under pressure, an oil reservoir, the blocks having passageways connected to the reservoir and to the first named passageways, the cylinders connected to the last named passageways, valve members for controlling the last named passageways and arranged in two rows for connecting the welders with the first named passageway and with the reservoir, a source of supply of electric current, contacts located below the surface of the oil in the reservoir for controlling the flow of the current to the said welding points, a traveler having means for operating the valve members in sequence, a screw for reciprocating the traveler with reference to the valve members, a reversible fluid motor for operating the screw, a valve for controlling the fluid motor, means for operating the valve to initiate movement of the traveler, and means for operating the valve to reverse the motor and to stop the motor.

9. In a welding machine, as set forth in claim 5, whereby the movement of the contacts directly determines the welding time.

10. In a welding machine as set forth in claim 5, including means to automatically vary the speed of the traveller while the machine is in operation.

11. In a welding machine as set forth in claim 5, including means to automatically vary the welding current while the machine is in operation.

12. In a welding machine, a plurality of individual welding units, each having a welding point and a fluid motor for pressing the same against the work, a source of supply of welding current and a control unit for said welding units comprising a source of supply of fluid under pressure, a series of valves for respectively connecting and disconnecting the motors of the individual welding units with said source of supply of fluid pressure, a traveler for operating said valves sequentially and a circuit closer associated with each valve and actuated therewith to supply welding current to the welding point while in contact with the work and to cut off current in advance of separation of said point from the work.

13. In a welding machine, a control unit for a plurality of individual fluid pressure operated welding units comprising a source of supply of fluid under pressure, conduits for connecting the individual welding units with said source of supply of fluid pressure, a series of valves for respectively controlling said conduits, an electric circuit closure associated with each valve and a traveler for operating said valves and associated circuit closures sequentially.

14. In a welding machine, a control unit for a plurality of individual fluid actuated welding units comprising a plurality of blocks, each carrying a series of valves, said blocks being assembled in series so that the valves correspond in number to the individual welding units, a source of supply of fluid under pressure to all of said valves, an electric circuit closure associated with each valve to be operated therewith, and a traveler for actuating said valves sequentially.

15. In a welding machine, a control unit for a plurality of individual fluid operated welding units comprising a source of supply of fluid under pressure, two parallel series of valves for controlling the admission and exhaust of fluid to the individual welding units, a reciprocating traveler and means on said traveler for sequentially actuating the valves in the two series, the valves of one series being actuated by the traveler when moving in one direction and that of the other series when moving in the reverse direction.

16. In a welding machine, a control unit for a plurality of individual fluid operated welding units comprising a source of supply of fluid under pressure, two parallel series of valves for controlling the admission and exhaust of fluid to the individual welding units, a reciprocating traveler and rockable cams on said traveler for respectively traversing the valves of the two series to sequentially actuate the same when moving in one direction and to ride over without actuation when moving in the reverse direction, the cam for one series actuating the valves thereof when the traveler is moving in one direction and the cam for the other series actuating the valves when the traveler is moving in the reverse direction.

HENRY W. ROTH.